(12) United States Patent
Boudet et al.

(10) Patent No.: US 6,525,256 B2
(45) Date of Patent: Feb. 25, 2003

(54) METHOD OF COMPRESSING A MIDI FILE

(75) Inventors: Daniel Boudet, Paris (FR); Xavier Sarremejean, Vaureal (FR); Hubert Helaine, Berkshire (GB); Mathieu Herbette, Belmont, CA (US); Christophe Comps, Colombes (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/836,341

(22) Filed: Apr. 18, 2001

(65) Prior Publication Data

US 2001/0045155 A1 Nov. 29, 2001

(30) Foreign Application Priority Data

Apr. 28, 2000 (FR) .............................. 00 05479

(51) Int. Cl.⁷ ................................................ G10H 7/00
(52) U.S. Cl. ........................................................ 84/645
(58) Field of Search ............................................ 84/645

(56) References Cited

U.S. PATENT DOCUMENTS 5,054,360 A * 10/1991 Lisle et al. ............... 84/645
5,680,512 A * 10/1997 Rabowsky et al. ........ 84/645 X
5,734,119 A   3/1998 France et al.
5,827,989 A  10/1998 Fay et al.
5,869,782 A   2/1999 Shishido et al.
5,974,387 A * 10/1999 Kageyama et al. ....... 84/645 X

FOREIGN PATENT DOCUMENTS

EP    0 694 902 A1    1/1996

* cited by examiner

*Primary Examiner*—Stanley J. Witkowski
(74) *Attorney, Agent, or Firm*—Sughrue Mion, PLLC

(57) ABSTRACT

To compress a MIDI format file it is converted to a format 0 file. The format 0 file is then scanned to reduce the number of possible instruments to 16. MIDI commands having no sound output are then eliminated and NoteOn and NoteOff commands are replaced by a PlayNote command. This eliminates instances of Δtime equal to 0. Based on the characteristics of an appliance that has to play the compressed file, the notes are recentered in a bandwidth compatible with the appliance, after which the file is scanned to seek instances of polyphony. If an instance of polyphony exceeds the capacities of the appliance it is reduced in accordance with an instrument priority list and a note pitch.

17 Claims, 2 Drawing Sheets

METHOD OF COMPRESSING A MIDI FILE

The present invention relates to a method of compressing a MIDI file. The field of the invention is that of appliances, usually portable appliances, which have limited memory capacity and computation power. The limitation can stem from the overall size of the appliance compared to the resources needed to reproduce a MIDI file as sound. However, the limitation can also stem from the quantity of resources that the appliance can allocate to reproducing a MIDI file as sound. The appliances referred to include mobile telephones and electronic organizers. The object of the invention is to improve the sound performance of appliances in the above-defined field. Another object of the invention is to make it easy to create and modify complex melodies that can be played by the appliances in that field.

BACKGROUND OF THE INVENTION

Mobile telephones having monophonic sound reproducing capabilities are known in the art. The melody played by a mobile telephone, either as ringing or on some other occasion, is a succession of sounds having a particular duration and a frequency. The same timbre is retained, however. A pure sinusoid is fed to an electro-acoustic appliance that reproduces it. The resulting metallic or electronic sounds are often very far removed from the work which served as a model for the melody.

The obvious solution to the above problem would be to store the melodies that the mobile telephone is required to play in its memory in a format that is used on compact discs, for example. The problem associated with that solution is that of memory space. A sampled format is very greedy in terms of memory space. In addition to this there is the current trend to offer more and more melodies on a mobile telephone. That trend is justified by the fact that the number of mobile telephones in use is increasing and it must be possible to tell which mobile telephone is ringing. There is therefore an incompatibility between the obvious solution and technical imperatives.

Added to this is the difficulty of modifying a sampled file. All the sounds are mixed together without it being possible to distinguish one from the other in the record in the file. If the above solution were chosen, it would therefore be impossible for a normal mobile telephone user to adapt a melody to suit their tastes.

The above problems could be solved by having the mobile telephone play a MIDI file, for example. There are a great many MIDI files that can very easily be generated and manipulated by a user having a fairly rudimentary knowledge of music. It would be desirable to be able to store the greatest possible number of MIDI files in a mobile telephone, to give the user the greatest possible choice of melodies. However, MIDI files require a greater memory capacity and a more powerful processor than are available in portable appliances.

OBJECT AND SUMMARY OF THE INVENTION

The invention solves this problem by compressing the MIDI files.

To be more precise, the invention provides a method of compressing a MIDI file, the method including an EVENT step consisting in:
  scanning the MIDI file to seek a start event and its associated end event, and
  replacing the pair thus found by a single event limited in time.

The single event has exactly the same effect as the pair, but the size of the single event is less than that of the pair. This transformation of the original MIDI file is totally reversible in terms of sound output.

In particular, in the method the start event is a "NoteOn" event defined by the MIDI standard and the associated end event is a "NoteOff" event defined by the MIDI standard.

Advantageously, the method further includes a POLY step consisting in:
  defining the necessary resources, in terms of memory and computing power, for playing a note on a given instrument,
  defining the resources of the reproduction means available for playing a MIDI file,
  structuring a memory table to define relative priorities of instruments,
  detecting in the MIDI file instances of polyphony which exceed the capabilities of the reproduction means,
  determining the resources to be used to reproduce a note, and
  eliminating from a detected instance of polyphony as many notes corresponding to instruments of the lowest relative priority of those contributing to the polyphony as are necessary to reduce the polyphony to a level acceptable by the reproduction means.

The method preferably further includes a BAND step consisting in:
  determining the bandwidth that an appliance can reproduce, and
  eliminating notes which are outside the reproduction capacities of the appliance.

The EVENT, POLY, and BAND steps can be effected in any order.

BRIEF DESCRIPTION OF THE DRAWINGS

The invention will be understood better after reading the following description and examining the accompanying drawings. The drawings are provided by way of example only and are not limiting on the invention. In the drawings.

MORE DETAILED DESCRIPTION

Figure 1:
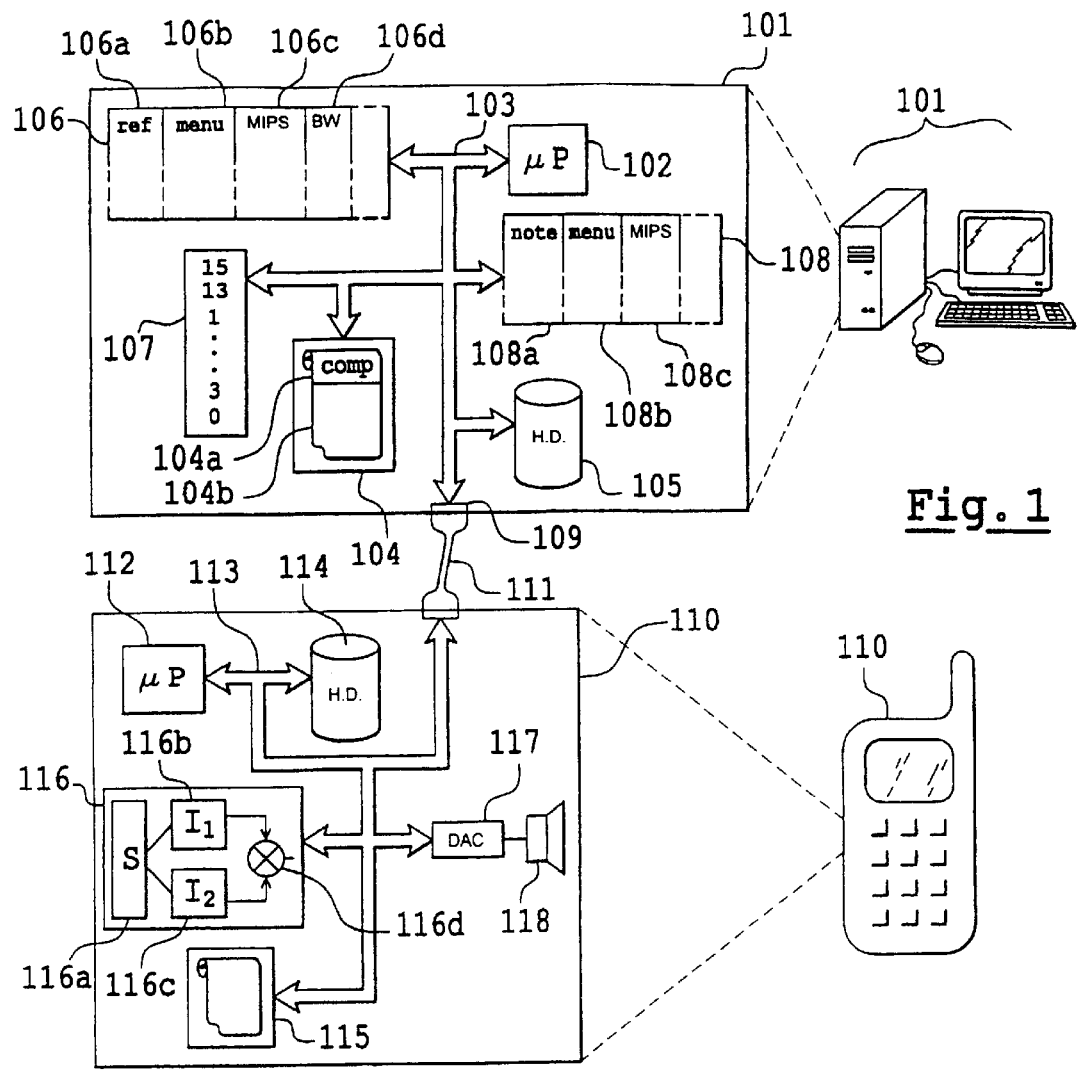
FIG. 1 shows means for implementing the method of the invention.

FIG. 1 shows an appliance 101 such as a personal microcomputer, for example. The computer 101 includes means for implementing the compression method of the invention. The computer 101 includes a microprocessor 102 connected to a bus 103. In the following description the term "bus" refers to a set of wires or tracks which convey address signals, data signals, control signals, interrupt signals and/or clock signals.

FIG. 1 also shows that the computer 101 includes a program memory 104. The memory 104 is connected to the bus 103 and includes an area 104a which contains instruction codes that control the microprocessor 102 when executing the method of the invention. The memory 104 includes a second area 104b which stores other instruction codes that control the microprocessor 102 when executing other tasks. The area 104b also includes a working memory area in which temporary variables are stored, for example. The computer 101 also includes a storage unit 105 for storing files, in particular those produced by the method of the invention. The unit 105 is connected to the bus 103.

FIG. 1 also shows that the computer 101 includes an appliance memory 106, a music instrument priority definition memory 107, and a memory 108 for defining the means necessary for playing a note. The memories 106 to 108 are connected to the bus 103. The memories can be physically separate or parts of a larger memory.

The memory 106 has a table structure. Each line of the memory 106 corresponds to an appliance. In this example the memory 106 has four columns. A first column 106*a* contains a reference of an appliance. A second column 106*b* contains the maximum memory space that the appliance with the reference in the first column can allocate to reproducing a MIDI file as sound. A third column 106*c* contains the maximum microprocessor power that the appliance with the reference in the first column can allocate to reproducing a MIDI file as sound. Finally, a fourth column 106*d* contains the bandwidth of sound production by the appliance with the reference in the first column. The table 106 is used to produce from a MIDI file a compressed file that is compatible with the capabilites of the appliance on which it must be played.

The memory 107 is a table, for example, in which the instruments that can be used in a compressed file are stored in order of increasing melodic importance. The memory 107 is used to process polyphony exceeding the reproduction capacities of the appliance for which the compressed file to be produced is intended.

TABLE 1 decreasing priority of instruments

| INSTRUMENT NUMBER IN THE INVENTION | INSTRUMENT |
|---|---|
| 15 | Special effects (telephone, explosion, etc.) |
| 13 | Folk instruments (sitar, banjo, etc.) |
| 1 | Tuned percussion (e.g. xylophone) |
| 2 | Organ |
| 6 | Ensemble (e.g. orchestra, choir) |
| 9 | Wind instrument (e.g. flute) |
| 7 | Brass (e.g. trumpet, tuba) |
| 8 | Saxophone/Bassoon/Clarinet |
| 10–12 | Synthesizer |
| 14 | Percussion |
| 5 | String instrument (e.g. violin/harp) |
| 4 | Bass |
| 3 | Guitar |
| 0 | Piano |

In Table 1, the highest priority instrument is the piano.

The memory 108 has a table structure with three columns. A first column 108*a* contains an identifier of a note, a second column 108*b* contains a quantity of memory needed to reproduce that note, and a third column 108*c* contains the microprocessor power needed to reproduce said note. The memory 108 can therefore determine the power needed to reproduce a note. The memory 108 is used at the same time as the memory 106. In practice the table 108 does not necessarily contain all notes that can be played. Formulae can be used to determine the power needed to play a note as a function of an instrument and the note. In practice it is preferable to use a formula because that is less costly in terms of memory space. However, for the purpose of explaining the invention it is easier to describe a table.

FIG. 1 also shows that the computer 101 has a port 109 for connecting the computer 101 to an appliance 110 via a cable 111. The port 109 is connected to the bus 103. In practice the port 109 can be a port with any RS232, USB or other format. However, the port 109 can also be replaced by radio means, for example a Bluetooth module. In this case, the appliance 110 must also be provided with Bluetooth means. The connection provided by the cable 111 is used to transfer a file obtained by the method of the invention from the computer 101 to the appliance 110. In this description the appliance 110 is a mobile telephone. In practice it can be any appliance able to reproduce as sound a file produced by the method of the invention.

The telephone 110 includes a microprocessor 112 connected to a bus 113. The telephone 110 also includes a storage unit 114 enabling it to store files produced by the method of the invention. The telephone 110 further includes a memory 115, means 116 for reproducing as sound a file produced by the method of the invention, and a digital-to-analogue converter 117. The units 114 to 117 are connected to the bus 113. The converter 117 is connected to an electro-acoustic appliance 118. In this description the electro-acoustic appliance 118 is a loudspeaker. The memory 115 includes working memory areas and contains instruction codes that control the microprocessor 112.

The means 116 can be either instruction codes or a dedicated circuit for reproducing files produced by the method of the invention. In this description files produced by the method of the invention are referred to as SEQ files. In a preferred embodiment of the invention the means 116 are instruction codes. The instruction codes are executed either by a signal processor or by a microprocessor such as the microprocessor 112. The instruction codes 116 can then be divided into a number of sub-routines. A first sub-routine 116*a* is referred to as a sequencer. The sequencer scans an SEQ file and decodes the instructions in that file. The sequencer allocates memory space for instruments 116*b* and 116*c* as a function of the instructions from the SEQ file. For example, if during the scanning of the file the sequencer reads an instruction assigning an instrument I1 to a channel, the sequencer allocates the memory space 116*b* to executing the instruction code corresponding to that instrument. The same goes for the memory space 116*c* corresponding to an instrument I2. The sequencer then continues to scan the SEQ file and sends the instructions that it reads there to ad hoc instruments. The instruments then produce samples which are sent to a mixer 116*d*. The mixed samples are then sent to the converter 117 which converts them into analogue signals which are reproduced by the loudspeaker 118. It must be understood that when a program, for example the sequencer 116*a*, sends instructions to another program, for example the instrument I1, the sequencer invokes a subroutine with instructions as parameters.

If the reference of the appliance 110 appears in Table 106, the column 106*b* corresponding to the appliance 110 contains the size of the memory 116, ignoring the size of the sequencer and the mixer. The column 106*c* contains the power that the microprocessor 112 can allocate to executing the instruction code from the memory 116. The memory 106*d* contains the bandwidth of the combination of the converter 117 and the loudspeaker 118. The number of melodies that can be stored in the appliance 110 is limited by the size of the unit 114. It is therefore important that the melodies are stored in a properly compressed form but without the compression requiring excessive calculations afterwards to be able to reproduce the compressed file. This is achieved by the format of a file produced by the method of the invention.

Figure 2:
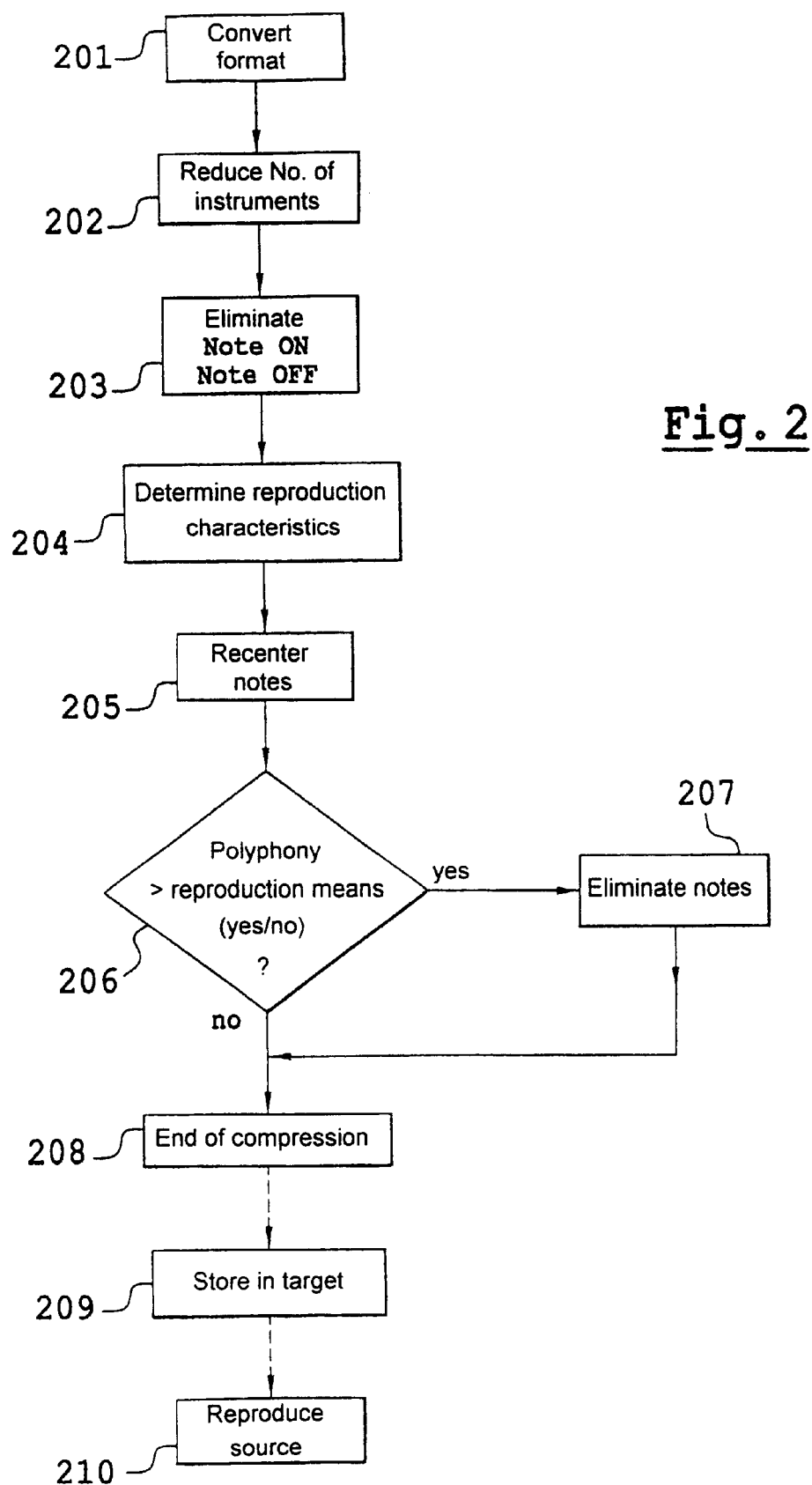
FIG. 2 shows steps of the method of the invention.

FIG. 2 shows the steps of one embodiment of the method of the invention. The method is described as being executed by the computer 101. It is nevertheless possible to execute the method on any hardware platform including ad hoc means. A mobile telephone is one such platform, for example. The method produces a file which must be transferred to the appliance which requires it.

The method of the invention processes a MIDI file, which is a file consisting of a series of commands that can be executed by an appliance including an interpreter for those commands.

MIDI files can have different formats, referred to as format 0, format 1 and format 2 (cf. MIDI Manufacturer Association specification 1.0, level 2, November 1999). Format 0 is the simplest. A format 0 file includes a header followed by a single track. The header includes a timebase for the file. The single track includes commands in the MIDI format. The difference between format 0 and the other formats resides mainly in the number of tracks. The change from format 1 or 2 to format 0 (step 201) is effected in a manner that is known in the art and using algorithms available in the art. A MIDI file includes mainly commands which each have an execution date.

In the embodiment of the method shown in FIG. 2, it is assumed that the MIDI file is a format 1 or 2 file and a preliminary format conversion step 201 is effected to convert a format 1 or 2 MIDI file to a format 0 file. The principle of conversion is to group all the commands of all the tracks of a format 1 or 2 file onto a single track of a format 0 file. It would be possible to dispense with the conversion and process each track of a format 1 or 2 MIDI file independently, however.

In the embodiment shown, after the conversion has been effected, the next step is an optional step 202 which reduces the number of instruments. This provides a better compression rate. A MIDI file contains commands that designate instruments. The instruments are designated by a field whose value is in the range from 0 to 127. There are therefore 128 possible instruments in a MIDI file. The 128 instruments belong to 16 families. The number of instruments is therefore reduced by electing one representative per family. The final result is 16 instruments. Each instrument of a family is then replaced by the representative of its family. The replacement is effected in accordance with the following table:

TABLE 2

| INSTRUMENT NUMBER IN GSM STANDARD | FAMILY NUMBER | INSTRUMENT REPRESENTING FAMILY |
|---|---|---|
| 0–7 | 0 | Piano |
| 8–15 | 1 | Tuned percussion (e.g. xylophone) |
| 16–25 | 2 | Organ |
| 25–32 | 3 | Guitar |
| 33–40 | 4 | Bass |
| 41–48 | 5 | String instrument (e.g. violin/harp) |
| 49–56 | 6 | Ensemble (e.g. orchestra, choir) |
| 57–64 | 7 | Brass (e.g. trumpet/tuba) |
| 65–72 | 8 | Saxophone/Bassoon/Clarinet |
| 73–80 | 9 | Wind instrument (e.g. flute) |
| 81–88 | 10 | Synthesizer ("non-polyphonic) |
| 89–97 | 11 | Synthesizer ("polyphonic") |
| 97–104 | 12 | Synthesizer ("special effects") |
| 105–112 | 13 | Folk instruments (sitar, banjo, etc.) |

TABLE 2-continued

| INSTRUMENT NUMBER IN GSM STANDARD | FAMILY NUMBER | INSTRUMENT REPRESENTING FAMILY |
|---|---|---|
| 113–120 | 14 | Percussion |
| 120–127 | 15 | Special effects (telephone, explosion, etc.) |

In the best embodiment of the method of the invention the instruments are also renumbered. In other words, each family representative is associated with a number specific to the format of the file to be obtained. As there are 16 instruments, that number can be coded on four bits, rather the seven bits that would be necessary if the original number of instruments had been retained. The only drawback of this approach is that the file obtained in this way after step 202 is no longer totally compatible with the general MIDI standard. However, it is easy to undo the change using Table 2, even if the resulting file is not identical to the original file.

In accordance with the invention, the MIDI file is compressed mainly by an EVENT step which seeks events and replaces them with a single event. In the embodiment shown, this step applies to the NoteOn and NoteOff events, for example. The EVENT step 203 seeks all the NoteOn and NoteOff events which are associated with each note. A NoteOn event is a MIDI command which is coded on three bytes. The command includes a NoteOn instruction code, the identification of a MIDI channel, volume information and a note number. In the general MIDI standard there are 16 channels and each channel is dynamically associated with an instrument. A channel-instrument instruction includes an association instruction code, a channel identifier and an instrument identifier. The instrument identifier is as defined by Table 2. A channel is associated with an instrument by a MIDI command. A NoteOff event designates the same channel and the same note as the NoteOn event with which it is associated, which is what allows a NoteOn event and a NoteOff event to be paired. In practice only one parameter, the volume, distinguishes a NoteOn event from a NoteOff event. A NoteOff event is a NoteOn event with zero volume. Once the NoteOn-NoteOff event pair has been identified, it is replaced by a single PlayNote instruction coded on four bytes. The PlayNote instruction includes channel, volume, note and duration information.

In the SEQ file the duration of a note is coded as a fraction of the duration of a black note and that fraction is referred to as the RTB (relative timebase). The actual duration of a note is therefore obtained by multiplying the duration by the RTB by the timebase of the file coded in the header of the file. Just as in the original file, the SEQ file includes a header which among other things codes the timebase of the file. The RTB is obtained by scanning the file. The RTB is the highest common factor of the durations of the notes in the file, for example. Exactly the same process is used to code the Δtime time-delays.

In the original MIDI file each event is preceded by a time-delay Δtime. The time-delay Δtime codes the time that must elapse before the next MIDI command is executed. Each MIDI command is preceded by a time-delay Δtime, even if it is equal to 0. In the sequential file the PlayNote command is also preceded by a time-delay Δtime command. However, because the Noteoff command is eliminated, the space occupied by the time-delay Δtime which preceded the NoteOff command is also saved.

In the SEQ file instances of the time-delay Δtime equal to 0 are also eliminated. The commands that must be executed simultaneously therefore follow on without being separated by time-delays Δtime equal to 0.

After step 203 a saving in size of thirty to forty percent compared to the original file has therefore already been achieved.

The next step 204 determines the reproduction characteristics. It is implemented by the computer 101, for example. During this step the screen of the computer 101 can show all telephones whose reference is listed in the memory 106. The user then has only to select the reference of their telephone to define the reproduction characteristics. If the user's telephone is not listed, or if the user wishes to use other parameters, they can enter their own parameters. In practice, and for a given telephone, the parameters are the memory space available for reproducing an SEQ file as sound, the processor power available for reproducing an SEQ file as sound, and the bandwidth of the audio system of the telephone. In FIG. 1 the audio system comprises the converter 117 and the loudspeaker 118. Another parameter that the user can access is the order in which the musical instruments are listed in Table 107. By default the highest priority instrument is the piano, followed by the guitar (see Table 1). If the user prefers the guitar they can give the guitar a higher priority than the piano. The user can do this by modifying the order of the instruments in the memory 107, for example.

The parameters selected in this way are used as parameters for the remainder of the method of the invention.

The next step is an optional step 205 for recentering the notes. The step 205 is useful if the file to be compressed includes notes which cannot be reproduced by the reproduction appliance because of the bandwidth of the converter 117 and the loudspeaker 118. In this case, the notes are moved so that they are within the bandwidth of the selected appliance. For example, all notes which are below the bandwidth are replaced by notes from the lowest octave that can be played and all notes that are above the bandwidth are replaced by the notes of the highest octave that can be played.

This shows the importance of the bandwidth parameter, as it varies from one appliance to another. Thus the same SEQ file is not always produced, depending on the appliance selected.

Figure 3:
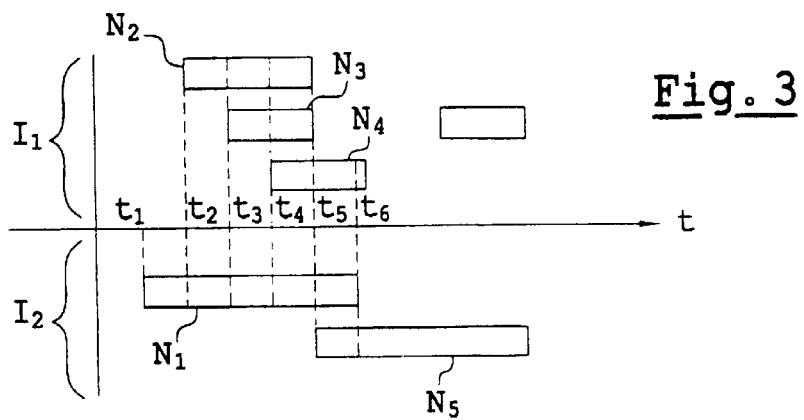
FIG. 3 shows an example of polyphony with two instruments.

The next step is an optional step 206 for analyzing instances of polyphony in the file to be compressed. FIG. 3 shows this step. The instrument I1 is a piano and the instrument I2 is a guitar. The priorities of Table 1 are complied with. The telephone 110 has a maximum power of 5 MIPS (millions of instructions per second) and 2 kilobytes of memory for reproducing the SEQ file. Also, each note played by instrument I1 requires 1.5 MIPS and 500 bytes and each note played by instrument I2 requires 1 MIPS and 1 kilobyte. FIG. 3 shows that at time t1 instrument I2 begins to play note N1. Thus 1 MIPS and 1 kilobyte are required between times t1 and t2, which is less than the capacities that can be allocated by the telephone 110. Thus all of the score between times t1 and t2 can be played. At time t2 instrument I1 plays note N2 at the same time as note N1. The power necessary is then 2.5 MIPS and 1.5 kilobytes, which still satisfies the requirements of the appliance 110. At time t3 the score features a third note N3 added by instrument I1. Thus at time t3 the power necessary is 4 MIPS and 2 kilobytes.

At time t4 instrument I1 plays notes N1, N3 and a third note N4. Instrument I2 is still playing note N1. The power needed to reproduce this combination is 5.5 MIPS and 2.5 kilobytes. The available power is therefore exceeded, both in terms of computation power and memory capacity. Instrument I1 has a higher priority than instrument I2 and the playing of note Ni therefore stops in order to satisfy the requirements of the appliance 110.

At time t5 instrument I1 ceases to play notes N2 and N3 and continues to play only note N4. Instrument I2 continues to play note N1 but also begins to play a note N5. The power necessary at time t5 is therefore 4.5 MIPS and 2.5 kilobytes. It is therefore necessary to eliminate a note played by instrument I2, which is the lower priority instrument. The note eliminated is the lowest note, namely note N5. At time t6 instrument I2 stops playing note N1. It is therefore possible to play notes N4 and N5 at the same time. Note N5 is therefore not played between times t5 and t6. The analysis of the file continues in this way.

When polyphony is detected, i.e. when more than one note has to be reproduced at the same time, the power necessary to reproduce the polyphony is calculated. If the power is insufficient, whether in terms of microprocessor power or memory capacity, the first step is to eliminate from the polyphony the notes played by the instrument which has the lowest priority. If the instrument which has the lowest priority plays more than one note in the polyphony, the lowest notes are eliminated first, and notes are eliminated until the remaining notes can be reproduced with the resources of the appliance 110. This process is applied to each appearance or disappearance of a note in the original file. This note elimination step is step 207.

It is possible that instances of polyphony in the file never exceed the power that the appliance 110 can provide. In this case, no additional compression is required and the compression process is therefore terminated. Otherwise the next step is step 207.

In step 208 the user of the computer 101 therefore has a SEQ format file stored in the unit 105.

The next step can then be a step 209 for recording on the target. Here the target is the appliance 110. In step 209 the computer 101 and the telephone 110 are connected by the cable 111. The memories 115 and 104 include instruction codes enabling the microprocessors 112 and 102 to communicate and exchange data in accordance with any protocol. The files stored in the unit 105 are transferred to the unit 114. When the transfer has been effected the appliance 110 becomes autonomous again and the next step can be a sound reproduction step 210. In step 210 the user of the telephone 110 has chosen a melody from those stored in the unit 114. That melody is stored in the unit 114 in the form of an SEQ file obtained by the method in accordance with the invention. The microprocessor 112, controlled by instruction codes from the memory 116, then reads the SEQ file to produce samples that are converted into sound by the converter 117 and the loudspeaker 118.

The format of the SEQ file obtained by the method of the invention also enables fast reproduction. Reducing the number of instructions for the same sound output also reduces the requirements for access to the memory and congestion on the bus 113. The reproduction as sound of a SEQ file is therefore no longer prejudicial to other processes executed by the microprocessor 112.

The program used by the computer 101 to produce the SEQ file can also be used to modify the SEQ file obtained. It is possible to edit the file in the form of a score, as shown in FIG. 3, for example, to adjust the tonality or the length of the notes. However, once the modification has been effected it is necessary to verify again that the modified file is within the specifications of the appliance in which it is to be stored.

What is claimed is:

1. A method of compressing a MIDI file, the method comprising:
   an EVENT step, said event step including at least the steps of:
      scanning the MIDI file to seek a start event and its associated end event and replacing the pair thus found by a single event limited in time; and
   a POLY step, said POLY step including at least the steps of:
      defining the necessary resources, in terms of memory and computing power, for playing a note on a given instrument;
      defining the resources of the reproduction means available for playing a MIDI file, and structuring a memory table to define relative priorities of instruments.

2. The method according to claim 1, wherein the start event is a "NoteOn" event defined by a MIDI standard and the associated end event is a "NoteOff even defined by a MIDI standard.

3. The method according to claim 1, wherein said POLY step further includes steps for:
   detecting in the MIDI file instances of polyphony which exceed the capabilities of the reproduction means,
   determining in the resources to be used to reproduce a note, and
   eliminating from a detected instance polyphony as many notes corresponding to instruments of the lowest relative priority of those contributing to the polyphony as are necessary to reduce the polyphony to a level acceptable by the reproduction means.

4. A method according to claim 1, further including a BAND step consisting in:
   determining the bandwidth that an appliance can reproduce, and
   eliminating notes which are outside the reproduction capacities of the appliance.

5. A method according to claim 1, further including a TRANSLATE step consisting in:
   determining the bandwidth that an appliance is capable of reproducing, and
   translating notes in a MIDI file that are outside that bandwidth so that those notes are within that bandwidth.

6. The method according to claim 1, wherein, if a detected instance of polyphony played by a single instrument exceeds the capabilities of the reproduction, the method further includes a LOW step for eliminating the lowest notes.

7. The method according to claim 1, further including a REDUC step for reducing the number of possible instruments in a MIDI file.

8. The method according to claim 7, wherein the number of instruments are grouped into families to reduce the number of instruments and each instrument is replaced in a MIDI file by a representative of its family.

9. The method according to claim 1, further including a SUPPRESS step for eliminating commands from a MIDI file which have no sound input.

10. A method according to claim 1 further including:
    executing a POLY step on a first appliance to produce a compressed file;
    transferring the compressed file to a second appliance; and
    playing the compressed file on the second appliance.

11. A method of compressing a MIDI file including:
    scanning the MIDI file to seek a start event and its associated end event;
    replacing the pair thus found by a single event limited in time;
    defining the necessary resources for playing a note on a given instrument;
    structuring a memory table to define relative priorities of instruments;
    detecting in the MIDI file instances of polyphony which exceed the capabilities of the reproduction means;
    determining the resources to be used to reproduce a note;
    eliminating from a detected instance of polyphony as many notes corresponding to instruments of the lowest relative priority of those contributing to the polyphony as are necessary to reduce the polyphony to a level acceptable by the reproduction means;
    determining the bandwidth that an appliance can reproduce, and eliminating notes which are outside the reproduction capacities of the appliance;
    wherein the method of compressing a MIDI file is executed on the selected appliance and played on the selected appliance.

12. A method of compressing a MIDI file including:
    reducing the number of instruments available to play a note stored in the file by selecting a single instrument to represent a family of instruments;
    locating a designated event within the file and replacing the designated event with a single event limited in time;
    determining reproduction characteristics for playing a file on a selected appliance including at least one of memory space, processor power and bandwidth; and
    based on the reproduction characteristics of the selected appliance, re-centering the notes within a bandwidth of the selected appliance, wherein all notes falling below the bandwidth of the selected appliance are replaced by notes from the lowest octave while notes falling above the bandwidth of the selected appliance are replaced by notes of the highest octave.

13. The method of compressing a MIDI file of claim 12, wherein the designated event is a "NoteOn" event defined by the MIDI standard and the associated end event is a "NoteOff" event defined by the MIDI standard.

14. A method of compressing a MIDI file including:
    reducing the number of instruments available to play a note stored in the file by selecting a single instrument to represent a family of instruments;
    locating a designated event within the file and replacing the designated event with a single event limited in time;
    determining reproduction characteristics for playing a file on a selected appliance; and
    based on the reproduction characteristics of the selected appliance,
        re-centering the notes within a bandwidth of the selected appliance, wherein all notes falling below the bandwidth of the selected appliance are replaced by notes from the lowest octave while notes falling above the bandwidth of the selected appliance are replaced by notes of the highest octave;
        detecting instances of polyphony in the MIDI file which exceed the capabilities of the reproduction characteristics of the selected appliance; and
        eliminating instruments of the lowest priority level of those instruments contributing to the detected instance of polyphony as are necessary to reduce the polyphony to a level acceptable by the reproduction characteristics of the selected appliance.

15. The method of compressing a MIDI file of claim 14, wherein the designated event start event is a "NoteOn" event defined by the MIDI standard and the associated end event is a "NoteOff" event defined by the MIDI standard.

16. A method of compressing a MIDI file including:

scanning the MIDI file to seek a start event and its associated end event;

replacing the pair thus found by a single event limited in time;

defining the necessary resources for playing a note on a given instrument;

structuring a memory table to define relative priorities of instruments;

detecting in the MIDI file instances of polyphony which exceed the capabilities of the reproduction means;

determining the resources to be used to reproduce a note;

eliminating from a detected instance of polyphony as many notes corresponding to instruments of the lowest relative priority of those contributing to the polyphony as are necessary to reduce the polyphony to a level acceptable by the reproduction means;

determining the bandwidth that an appliance can reproduce, and eliminating notes which are outside the reproduction capacities of the appliance.

17. The method of compressing a MIDI file of claim 16, wherein the start even is a "NoteOn" event defined by the MIDI standard and the associated end event is a "NoteOff" event defined by the MIDI standard.

* * * * *